(12) United States Patent
Yoshimura et al.

(10) Patent No.: US 7,698,271 B2
(45) Date of Patent: Apr. 13, 2010

(54) CONCEPTUAL NETWORK GENERATING SYSTEM, CONCEPTUAL NETWORK GENERATING METHOD, AND PROGRAM PRODUCT THEREFOR

(75) Inventors: Hiroki Yoshimura, Tokyo (JP); Motoyuki Takaai, Ashigarakami-gun (JP); Hiroshi Masuichi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 324 days.

(21) Appl. No.: 11/688,902

(22) Filed: Mar. 21, 2007

(65) Prior Publication Data
US 2008/0071782 A1    Mar. 20, 2008

(30) Foreign Application Priority Data
Sep. 15, 2006 (JP) .............................. 2006-251915

(51) Int. Cl.
*G06F 17/30* (2006.01)
(52) U.S. Cl. ............. 707/6; 707/E17.001; 707/E17.098; 706/46
(58) Field of Classification Search ............. 707/3, 707/6, 101, 104.1, E17.001, E17.098; 706/45–47
See application file for complete search history.

(56) References Cited

U.S. PATENT DOCUMENTS 5,297,039 A * 3/1994 Kanaegami et al. ............ 707/5
6,038,560 A * 3/2000 Wical ............................. 707/5
6,076,051 A * 6/2000 Messerly et al. ............... 704/9
2003/0120640 A1   6/2003 Ohta et al.

FOREIGN PATENT DOCUMENTS

| JP | 07-244669 A | * | 9/1995 |
| JP | 2001-243223 A | | 9/2001 |
| JP | 2003-186894 A | | 7/2003 |

OTHER PUBLICATIONS

Hiroshi Masuichi, et al.; "Constructing a Practical Japanese Parser Based on Lexical Functional Grammar"; Journal of Natural Language Processing; vol. 10, No. 2; pp. 79-109; The Association for Natural Language Processing; 2003.

* cited by examiner

*Primary Examiner*—Tim T. Vo
*Assistant Examiner*—Shiow-Jy Fan
(74) *Attorney, Agent, or Firm*—Sughrue Mion, PLLC

(57) ABSTRACT

A conceptual network generating system that generates a conceptual network showing conceptual relations between words, the conceptual network generating system including: a first searching unit that searches a knowledge source storing search sentences; a first generating unit that analyzes the retrieved first search result sentence; a holding unit that stores the generated first structure information in a memory unit; a second searching unit that searches the knowledge source; a second generating unit that analyzes the retrieved second search result sentence; a calculating unit that calculates similarity between the generated second structure information and the stored first structure information; and a setting unit that generates conceptual network information.

14 Claims, 21 Drawing Sheets

FIG. 7A

| FIRST HIERARCHICAL LEVEL | | SECOND HIERARCHICAL LEVEL |
|---|---|---|
| 1,SUBJ | 1,OBJ | 2,MOD |
| WRITE ,Wna | WRITE ,Wnb | Wnb,null |

FIG. 7B

| Wna | Wnb | new |
|---|---|---|
| 1,SUBJ | 1,OBJ | – |
| SHAKESPEARE | HAMLET | – |

FIG. 11A

| FIRST HIERARCHICAL LEVEL | | SECOND HIERARCHICAL LEVEL |
|---|---|---|
| 1,SUBJ | 1,OBJ | 2,MOD |
| WRITE ,Wna | WRITE,new1 | new1,new2 |

FIG. 11B

| Wna | Wnb | new1 | new2 |
|---|---|---|---|
| 1,SUBJ | - | 1,OBJ | 2,MOD |
| SHAKESPEARE | - | MACBETH | TRAGIC DRAMA |

FIG. 19

EARLY-STAGE   ------ D
STOMACH CANCER

CANCER — D

OUTWARD — D

PROGRESSION -- D

SUBMUCOSA — D

STOPS — D

WHERE — D

STOMACH CANCER — D

CONCEPTUAL NETWORK GENERATING SYSTEM, CONCEPTUAL NETWORK GENERATING METHOD, AND PROGRAM PRODUCT THEREFOR

BACKGROUND

1. Technical Field

The present invention relates to a conceptual network generating system that generates a conceptual network showing the conceptual relations between words, and a conceptual network generating method and a conceptual network generating program.

2. Related Art

A conceptual network shows conceptual connections (conceptual relations) existing between words that are systematically classified based on predetermined definitions. One type of conceptual relation is represented by the relation between an upper conception and a lower conception ("Is-a" relation). For example, in a case where the words such as "car" and "aircraft" are systematically classified under the category of "transportation", the upper conception is "transportation" while the lower conception is "car" and "aircraft". Conceptual relations are often shown in the form of an effective graph that is formed with nodes and links. For example, the conceptual relation between the upper conception "transportation" and the lower conception "car" is shown as "transportation→car".

A conceptual network can be created by a semiautomatic operation in which some parts of analysis data are produced manually while the other parts are automatically produced with the use of a computer, and the produced data is checked by human eyes. However, this data producing operation requires human hands and large production costs, even though it is "semiautomatic". Also, a conceptual network might be arbitrarily generated by a particular person in such an operation.

With the above facts being taken into consideration, there has been a demand for an automatic operation for generating conceptual networks.

However, by any conventional technique, the frequency information about the words contained in documents is used, and as a result, the conceptual relations between words cannot be accurately extracted.

SUMMARY

According to an aspect of the present invention, there is provided a conceptual network generating system that generates a conceptual network showing conceptual relations between words, the conceptual network generating system including: a first searching unit that searches a knowledge source storing search sentences, using as a search query first and second words conceptually related to each other, and retrieves a first search result sentence containing the first and second words; a first generating unit that analyzes the retrieved first search result sentence, and generates first structure information indicating words contained in the first search result sentence and a structure of the first search result sentence; a holding unit that stores the generated first structure information in a memory unit; a second searching unit that searches the knowledge source, using the first word as a search query, and retrieves a second search result sentence containing the first word; a second generating unit that analyzes the retrieved second search result sentence, and generates second structure information indicating words contained in the second search result sentence and a structure of the second search result sentence; a calculating unit that calculates similarity between the generated second structure information and the stored first structure information; and a setting unit that generates conceptual network information, based on the generated first structure information and second structure information having a similarity value equal to or larger than a first predetermined value with respect to the first structure information, the conceptual network information showing a conceptual relation between the first word and a word contained in the second search result sentence corresponding to the second structure information, the word being equivalent to the second word in the first search result sentence.

BRIEF DESCRIPTION OF THE DRAWINGS

Exemplary embodiments of the present invention will be described in detail based on the following figures, wherein:

FIGS. 7A and 7B show an example of the first case structure pattern information with respect to the first search result sentence;

FIGS. 11A and 11B show an example of second case structure pattern information with respect to the second search result sentence;

FIG. 19 shows an example of a dependency parsing result.

DETAILED DESCRIPTION

Figure 1:
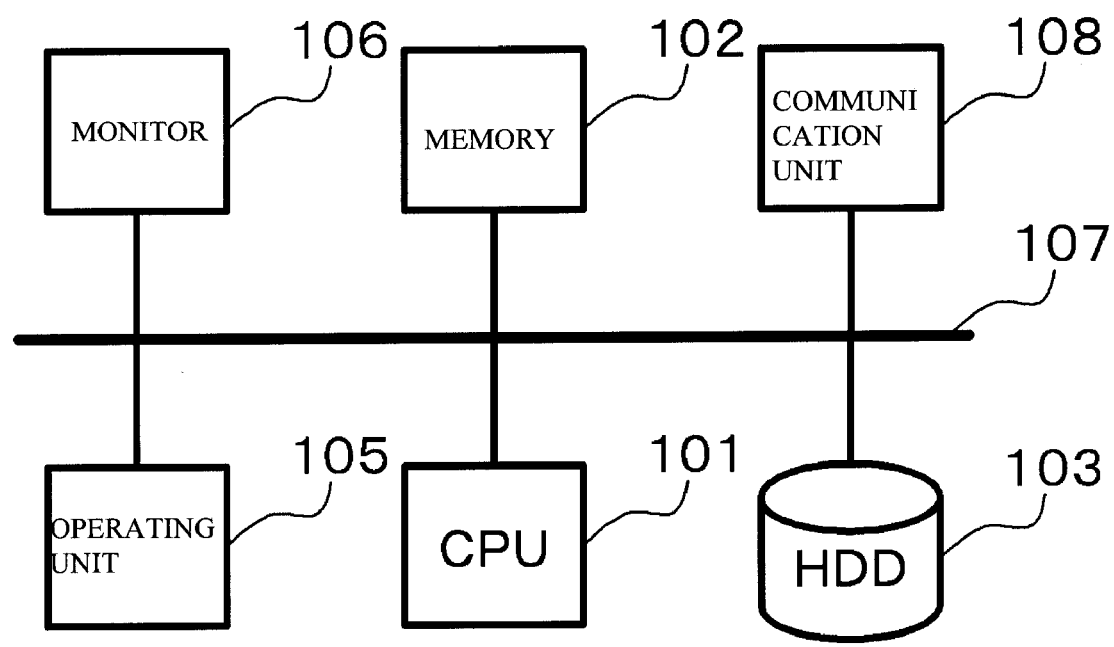
FIG. 1 shows the hardware structure of a PC in a conceptual network generating system in accordance with the present invention.

The following is a description of embodiments of the present invention, with reference to the accompanying drawings. FIG. 1 illustrates the hardware structure of a conceptual network generating system. The conceptual network generating system shown in FIG. 1 is a personal computer (PC) 100 that includes a CPU 101 connected to an internal bus 107, a memory 102, a hard disk drive (HDD) 103, an operating unit 105, a monitor 106, and a communication unit 108.

Figure 2:
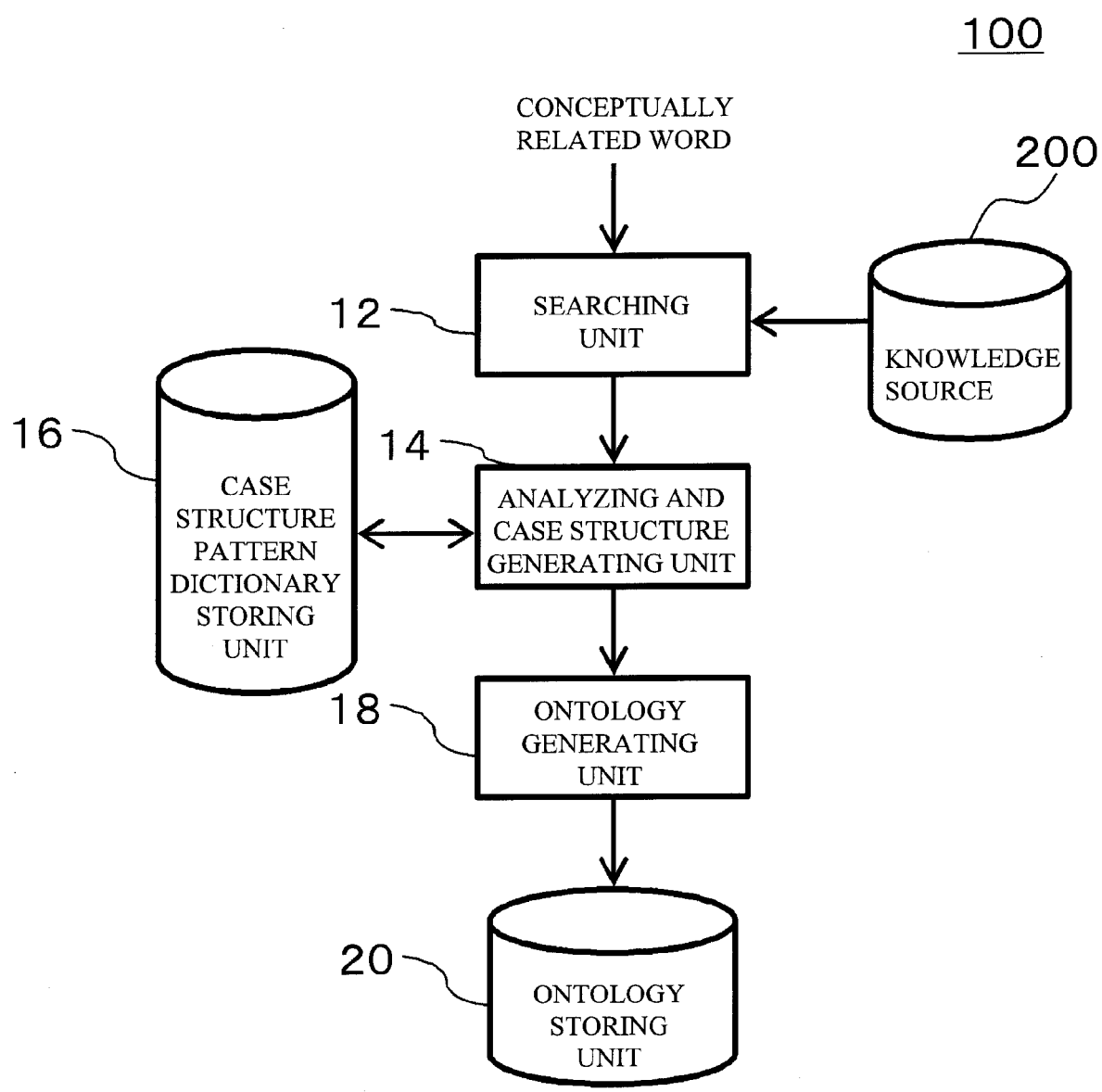
FIG. 2 is a functional block diagram of the PC in the conceptual network generating system.

FIG. 2 is a functional block diagram of the PC 100 forming a conceptual network generating system. The PC 100 forming a conceptual network generating system shown in FIG. 2 includes a searching unit 12 equivalent to the first searching unit and the second searching unit in the claims, an analyzing and case structure generating unit 14 equivalent to the first generating unit, the second generating unit, the holding unit, and the calculating unit in the claims, a case structure pattern dictionary storing unit 16, an ontology generating unit 18 equivalent to the setting unit in the claims, and an ontology storing unit 20. In the hardware structure shown in FIG. 1, each of those function blocks is embodied by the CPU 101 executing a predetermined program read from the HDD 103 and stored in the memory 102 in accordance with an operation through the operating unit 105.

The PC 100 forming the conceptual network generating system stores case structure information in a case structure pattern dictionary, and generates an ontology that is conceptual network information based on the case structure information.

Figure 3:
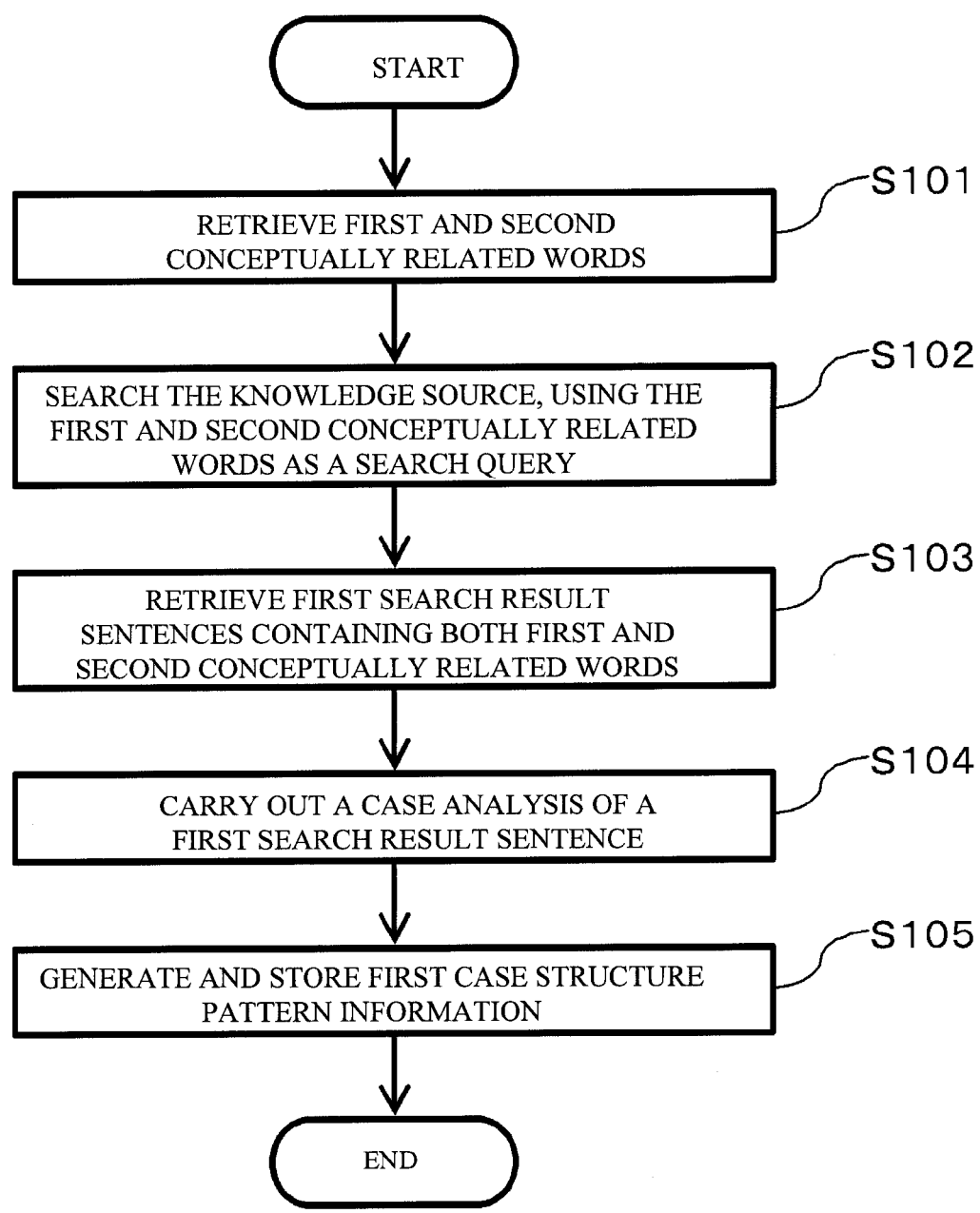
FIG. 3 is a flowchart of an operation of storing case structure pattern information in a case structure pattern dictionary.

First, the operation of storing case structure pattern information in the case structure pattern dictionary is described. FIG. 3 is a flowchart of the operation to be performed by the PC 100 to store case structure pattern information in the case structure pattern dictionary. When a user inputs first and second words conceptually related to each other (the first and second conceptually related words) by operating the operating unit 105 (such as a keyboard), the searching unit 12 retrieves the first and second conceptually related words (S102). When inputting the first and second conceptually related words, the user describes those words so that the conceptual connection can be determined. In a case where the higher conception word is "transportation" and the lower conception word is "car", for example, if the upper conception word and the lower conception word are to be written in this order, the user writes "transportation→car", and, if the lower conception word and the upper conception word are to be written in this order, the user writes "car←transportation". The user may also write more than one conception connections shown with one or more commas, such as "transportation→car, car→sedan". Alternatively, the words may be separated with a space, like "transportation car". In such a case, the upper conception word must be put before the lower conception word.

Using the first and second conceptual related words as a search query, the searching unit 12 searches a knowledge source 200 existing in the Internet for a search sentence, and retrieves the search result (S102). The searching unit 12 then retrieves a sentence including both first and second conceptually related words (the first search result sentence) from the search result sentences (S103).

The analyzing and case structure generating unit 14 carries out a case analysis of the first search result sentence (S104). Based on the result of the case analysis, the analyzing and case structure generating unit 14 generates first case structure pattern information that indicates the words in the first search result sentence and the case structure of the first search result sentence, and stores the first case structure pattern information in the case structure dictionary in the case structure pattern dictionary storing unit 16 (S105). In this manner, the first case structure pattern information is stored as a part of the case structure pattern dictionary.

Figure 4A:
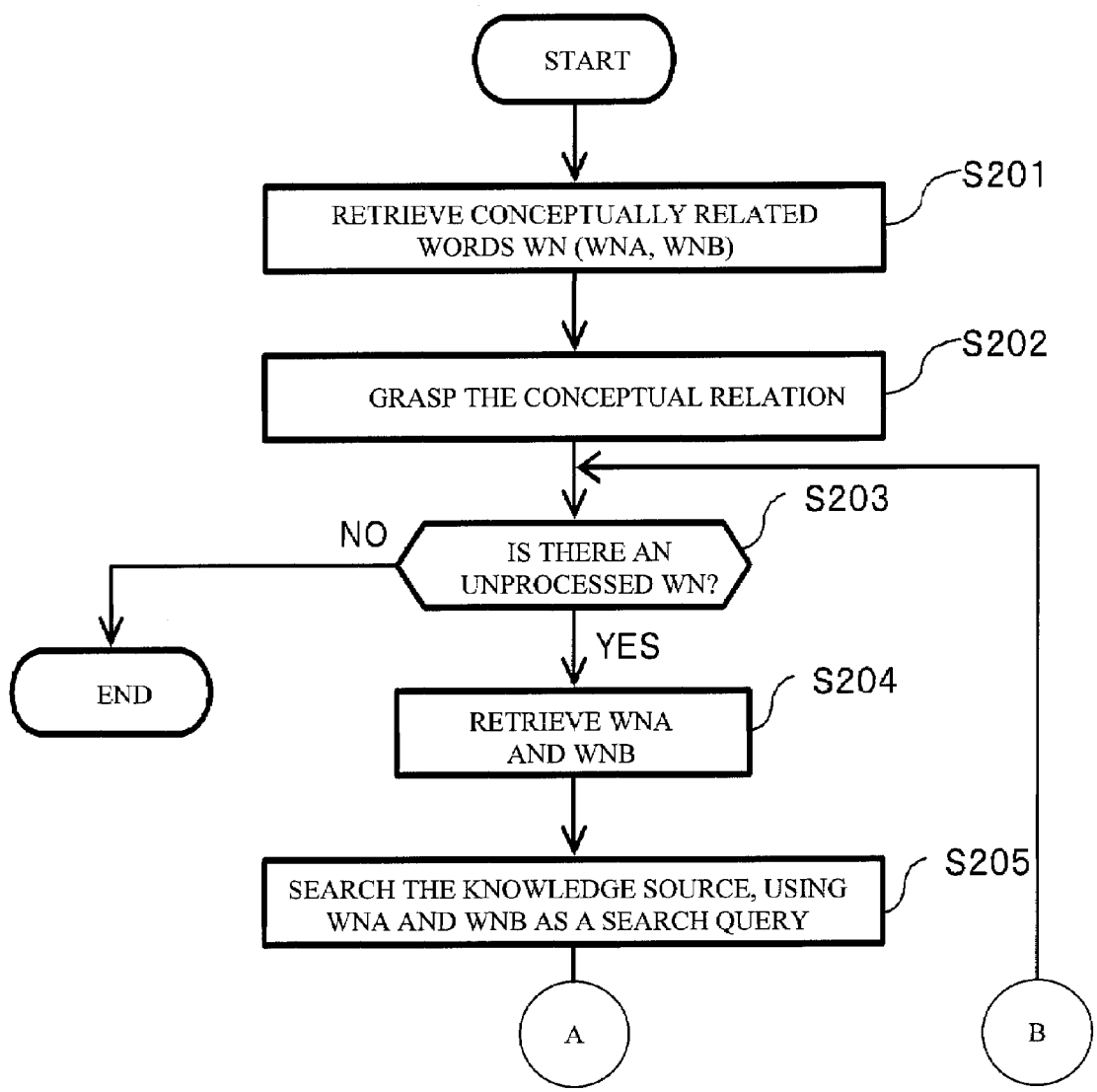
FIGS. 4A and 4B is a flowchart showing in greater detail the operation of storing the case structure pattern information in the case structure pattern dictionary.
Figure 4B:
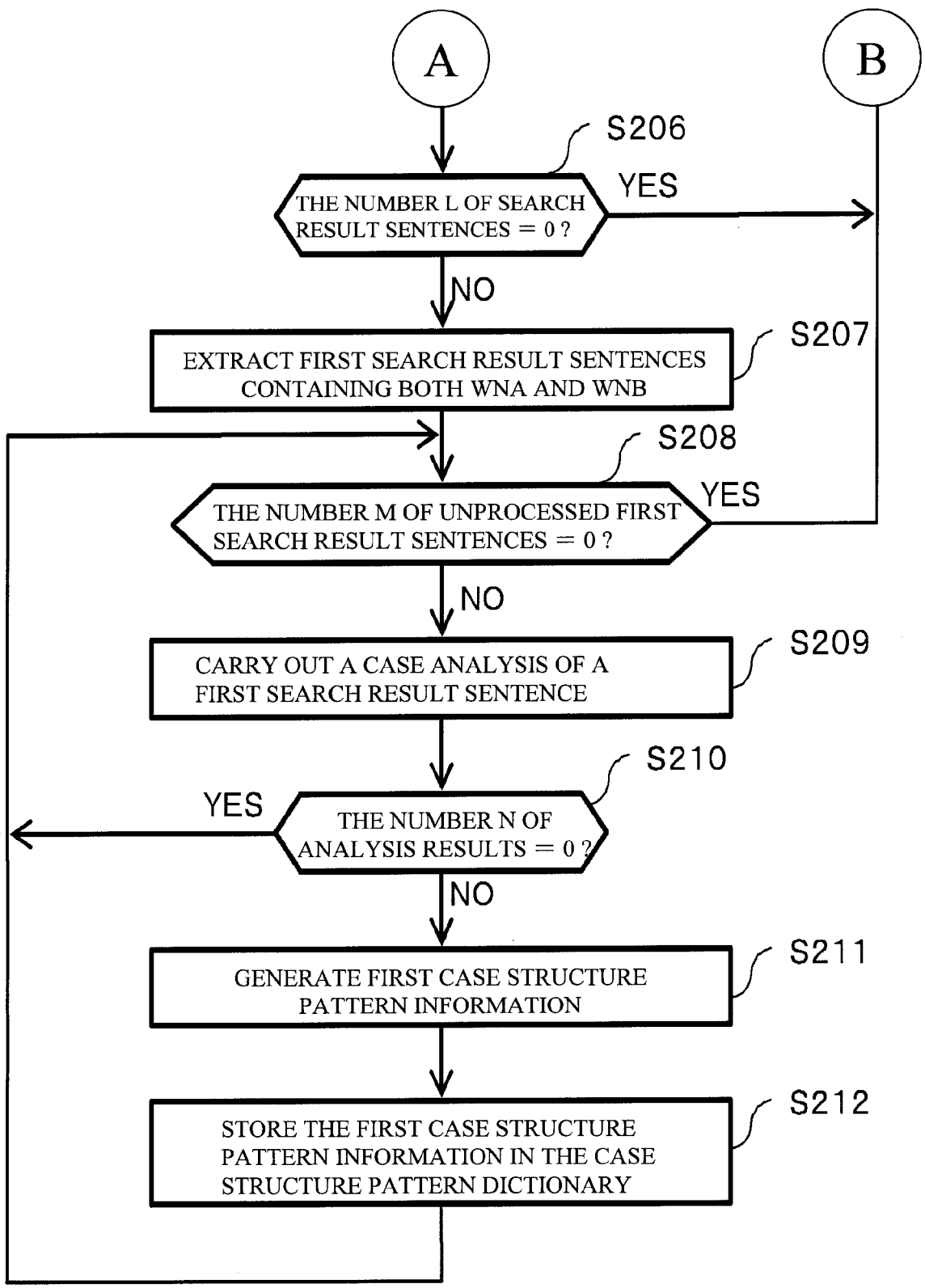

The operation of storing the case structure pattern information is now described in greater detail. FIGS. 4A and 4B is a flowchart showing in greater detail the operation to be performed by the PC 100 to store the case structure pattern information in the case structure pattern dictionary. When a user operates the operating unit 105 (such as a keyboard) to input a combination Wn (Wna, Wnb) (n being 1 or greater) of two words conceptually related to each other (a conceptually related word Wna and a conceptually related word Wnb), the searching unit 12 retrieves the combination Wn (Wna, Wnb) of conceptually related words (S201), and grasps the conceptual relation between the conceptually related words Wna and Wnb (S202).

The searching unit 12 then determines whether there is an unprocessed one of the retrieved combinations of Wn (Wna, Wnb) of conceptually related words. More specifically, the searching unit 12 determines whether there is a combination not to be processed in the procedures of S204 and later (S203). If there is not an unprocessed combination Wn (Wna, Wnb) of conceptually related words, the series of procedures come to an end. If there is one or more unprocessed combinations Wn (Wna, Wnb) of conceptually related words, on the other hand, the searching unit 12 selects one of them, and retrieves the conceptually related words Wna and Wnb contained in the selected combination Wn (Wna, Wnb) of conceptually related words (S204).

Using the retrieved conceptually related words Wna and Wnb as a search query, the searching unit 12 then searches the knowledge source 200, and retrieves search result sentences that contain at least one of the conceptually related words Wna and Wnb (S205). The searching unit 12 further determines whether the number L of search result sentences retrieved through the search is zero (S206). If the number L of search result sentences is zero, or if there is not a sentence containing at least one of the conceptually related words Wna and Wnb in the knowledge source 200, the procedure for determining whether there is an unprocessed combination Wn (Wna, Wnb) of conceptually related words (S203) and the procedures thereafter are repeated.

If the number L of search result sentences is not zero, the searching unit 12 extracts sentences containing both conceptually related words Wna and Wnb (the first search result sentences) from the search result sentences (S207). The searching unit 12 then determines whether the number M of unprocessed first search result sentences is zero, or more specifically, determines whether there is a first search result sentence not to be processed in the procedures S209 and later (S208). If there is not a sentence containing both conceptually related words Wna and Wnb in the knowledge source 200, or if all the first search result sentences have been processed, the procedure for determining whether there is an unprocessed combination Wn (Wna, Wnb) of conceptually related words and the procedures thereafter are repeated.

Figure 5:
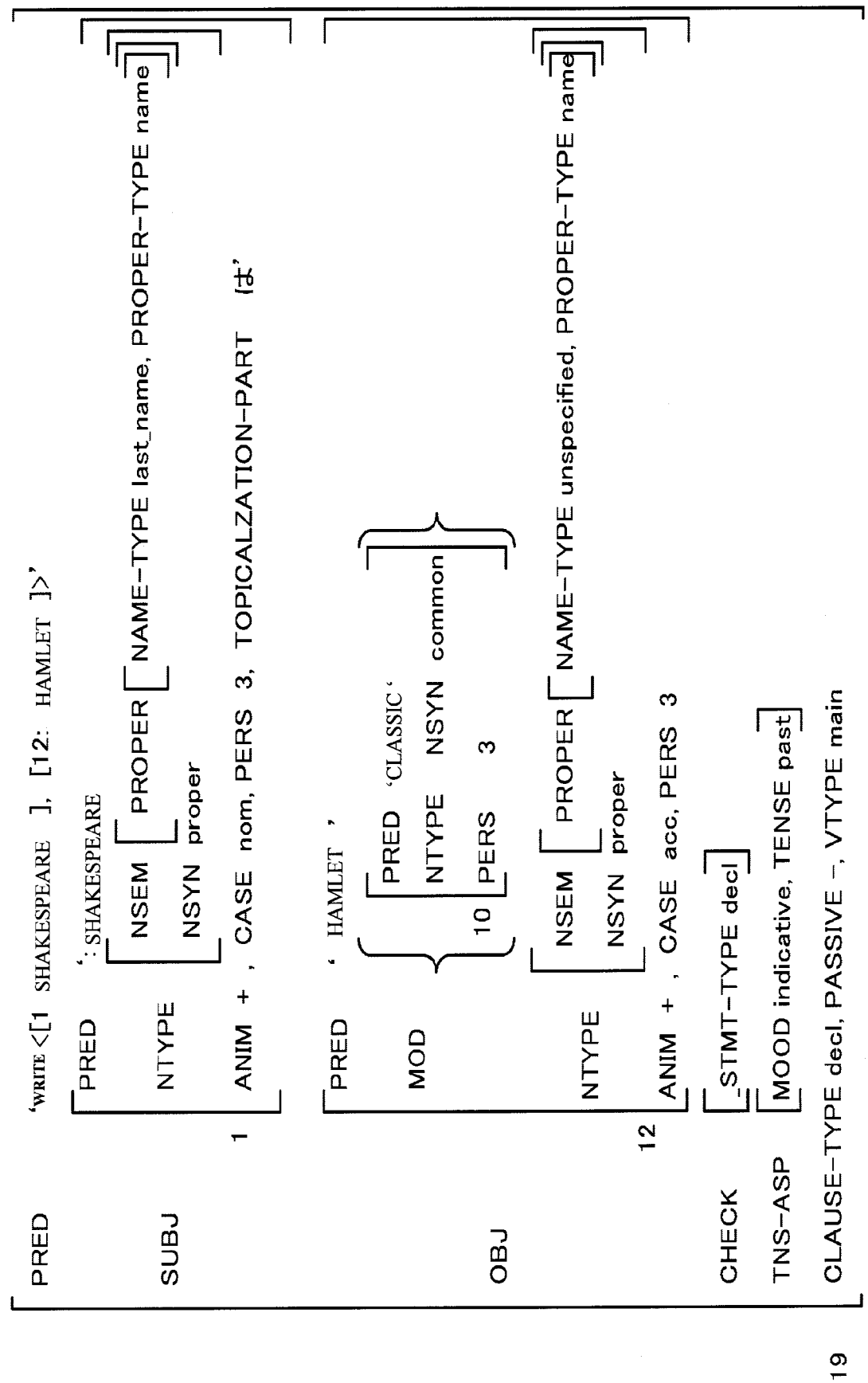
FIG. 5 shows an example of the "f-structure" with respect to a first search result sentence.

If the number M of first search result sentences is not zero, the searching unit 12 outputs the first search result sentence(s) to the analyzing and case structure generating unit 14. The analyzing and case structure generating unit 14 selects one of the input first search result sentences, and carries out a case analysis of the selected first search result sentence (S209). The case analysis is carried out with the use of a case analysis system that outputs sentence structures based on Lexical Functional Grammar (LFG). LFG is designed to output a case structures called "f-structure (f-str)" as an analysis result, and is described in detail in a non-patent document, "Constructing a practical Japanese Parser based on Lexical Functional Grammar" by Masuichi and Ohkuma, Journal of Natural Language Processing, Vol. 10, No. 2, pp. 79-109, The Association for Natural Language Processing, 2003, and in the references cited in the non-patent document. For example, in a case where the conceptually related word Wna of the higher conception is "Shakespeare", the conceptually related word Wnb of the lower conception is "Hamlet", and the first search result sentence is "Shakespeare wrote the classic 'Hamlet'", the "f-structure" becomes as shown in FIG. 5.

The analyzing and case structure generating unit 14 then determines whether the number N of analysis results is zero (S210). If the number N of analysis results is zero, in other words, if the "f-structure" cannot be obtained, the procedure for determining whether the number M of unprocessed first search result sentences is zero (S208) and the procedures thereafter are repeated.

Figure 6:
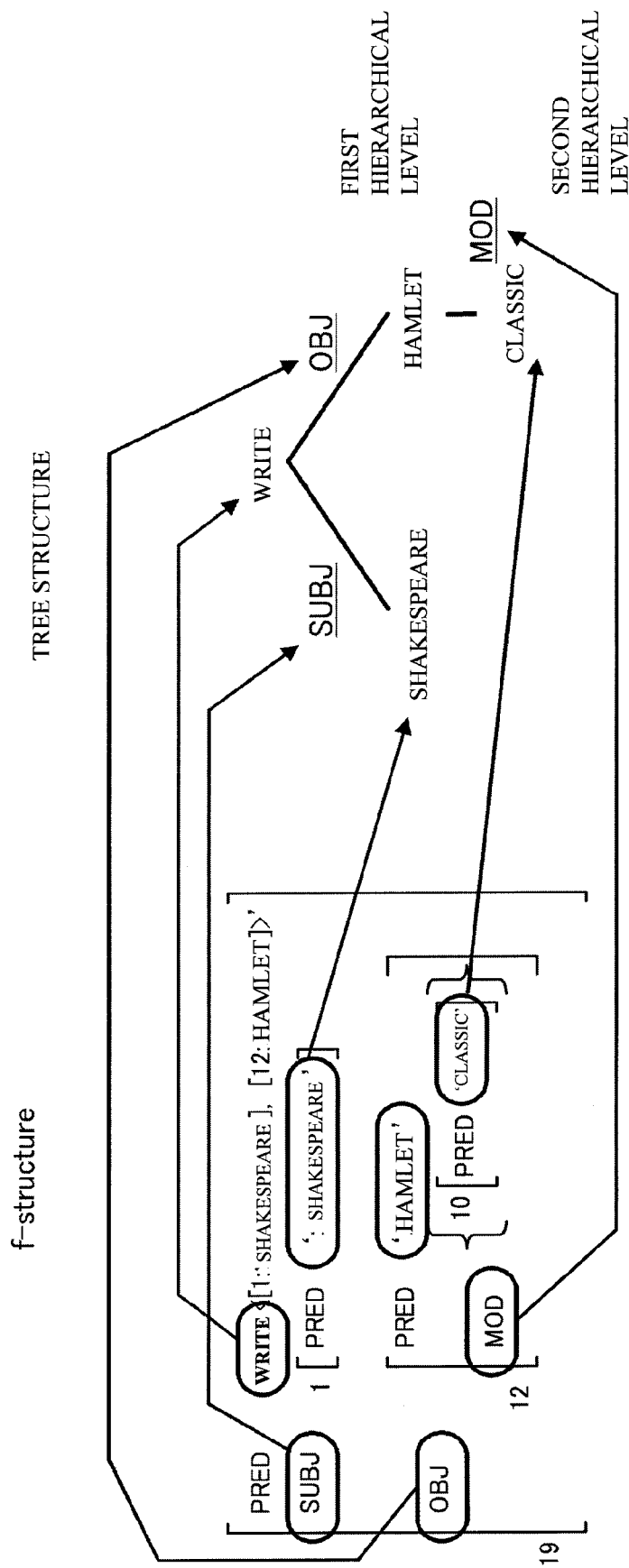
FIG. 6 shows an example of the relationship between the "f-structure" and the tree structure with respect to the first search result sentence.

If the number N of analysis results is not zero, the analyzing and case structure generating unit 14 converts the "f-structure" into a tree structure representing the case structure in the form of a hierarchal structure. A tree structure has surface character strings of predicates (PRED) attached to the nodes, and grammatical functions to the link labels. FIG. 6 shows the relation between the "f-structure" and the tree structure in a case where the conceptually related word Wna of the higher conception is "Shakespeare", the conceptually related word Wnb of the lower conception is "Hamlet", and the first search result sentence is "Shakespeare wrote the classic 'Hamlet'.".

Based on the obtained tree structure, the analyzing and case structure generating unit 14 generates the first case structure pattern information indicating the words in the first search result sentence and the case structure of the first search result sentence (S211). More specifically, the analyzing and case structure generating unit 14 adds the information representing conceptually related words to the data structures of the first case structure pattern information for each level and for each grammatical function in the tree structure.

The first case structure pattern information includes a first data structure and a second data structure. FIGS. 7A and 7B show an example of the first case structure pattern information corresponding to the tree structure shown in FIG. 6. For each of the words shown in the tree structure, the first row of the first data structure shows the hierarchical level and the grammatical function of the word. If the word is a conceptually related word, the second row of the first data structure shows the identifier of the conceptually related word. If the word is not a conceptually related word, the second row of the first data structure shows "null" representing the word and the surface character string of the predicator (being not necessary a verb, but may be a conceptually related word) for the word. In the tree structure shown in FIG. 6, the conceptually related word Wna "Shakespeare" that has the grammatical function as a subject (SUBJ) and the conceptually related word Wnb "Hamlet" that has the grammatical function as an object (OBJ) exist on the first hierarchical level, and "write" is the predicator for the conceptually related word Wna "Shakespeare" and the conceptually related word Wnb "Hamlet". Accordingly, in the first data structure shown in FIG. 7A, as for the conceptually related word Wna "Shakespeare", the first row shows the hierarchical level number "1" and "SUBJ" indicating the grammatical function as a subject, and the second row shows data including the surface character string "write" as the predictor and the identifier "Wna" of the conceptually related word. As for the conceptually related word Wnb "Hamlet", the first row shows the hierarchical level number "1" and "OBJ" indicating the grammatical function as an object, and the second row shows data including the identifier "Wnb" of the conceptually related word. In the tree structure shown in FIG. 6, other than the conceptually related words, the word "classic" having a grammatically function MOD exists on the second hierarchical level, and the predicator for the word "classic" is the conceptually related word Wnb "Hamlet". In the first data structure shown in FIG. 7A, as for the word "classic" that is not a conceptually related word, the first row shows the hierarchical level number "2" and "MOD" indicating the grammatical function, and the second row shows data including the identifier "Wnb" of the conceptually related word and "null" representing the word "classic" that is not a conceptually related word.

In the second data structure, for each of the words shown in the tree structure, the first row shows the identifier of a conceptually related word, if the word is the conceptually related word. If the word is not a conceptually related word, the first row shows the identifier "new" of the word, and the second row shows the hierarchical level and the grammatical function of the word. If the word is a conceptually related word, the third row shows the surface character string of the conceptually related word. In the tree structure shown in FIG. 6, the conceptually related word Wna "Shakespeare" that has the grammatical function as a subject (SUBJ) and the conceptually related word Wnb "Hamlet" that has the grammatical function as an object (OBJ) exist on the first hierarchical level. Accordingly, in the second data structure shown in FIG. 7B, as for the conceptually related word Wna "Shakespeare", the first row shows the identifier "Wna" of the conceptually related word, the second row shows the hierarchical level number "1" and "SUBJ" indicating the grammatical function as a subject, and the third row shows data including the surface character string "Shakespeare". As for the conceptually related word Wnb "Hamlet", the first row shows the identifier "Wnb" of the conceptually related word, the second row shows the hierarchical level number "1" and "OBJ" indicating the grammatical function as an object, and the third row shows data including the surface character string "Hamlet". Further, in the second data structure shown in FIG. 7B, as for the word "classic" that is not a conceptually related word, the first row shows the identifier "new" of the word that is not a conceptually related word, and the second and third rows show data as spaces.

The analyzing and case structure generating unit 14 then generate the above first case structure pattern information, and stores and holds the first case structure pattern information in the case structure pattern dictionary of the case structure pattern dictionary storing unit 16 (S212). After that, the procedure for determining whether the number M of unprocessed first search result sentences is zero (S208) and the procedures thereafter are repeated. If the number M of unprocessed first search result sentences is zero, the procedure for determining whether there is an unprocessed combination Wn (Wna, Wnb) of conceptually related words (S203) is carried out. Where all the combinations Wn (Wna, Wnb) of conceptually related words have been processed, the series of procedures come to an end.

However, the analyzing and case structure generating unit 14 may be designed to store the first case structure pattern information in the case structure pattern dictionary of the case structure pattern dictionary storing unit 16, only in a case where a value (a storage determining value) calculated for the first case structure pattern information having the same case structures is equal to or larger than a predetermined value. More specifically, the analyzing and case structure generating unit 14 calculates the storage determining value in accordance with the following Equation (1). In Equation (1), "sametreenum" represents the number of pieces of first case structure pattern information having the same case structures, and "alltreenum" represents the total number of pieces of first case structure pattern information.

$$\text{Storage determining value} = \log\left(\frac{alltreenum}{\sum sametreenum}\right) \quad \text{(Equation 1)}$$

Figure 8:
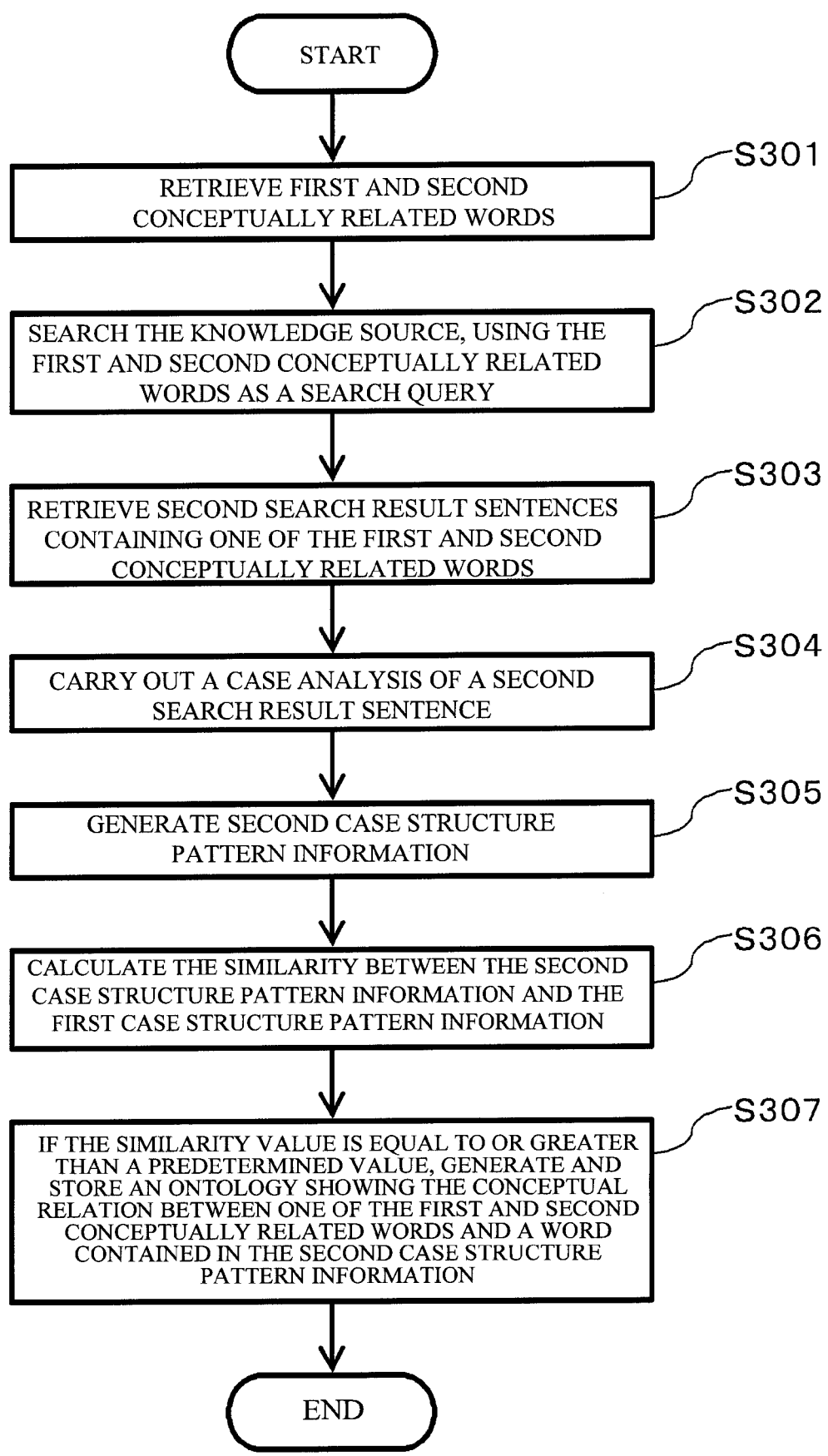
FIG. 8 is a flowchart of an ontology generating operation.

Next, an ontology generating operation is described. FIG. 8 is a flowchart of an ontology generating operation to be performed by the PC 100. The procedures of S301 and S302 are the same as those of S101 and 102 shown in FIG. 3. Accordingly, the procedures of S301 and S302 are not necessarily carried out in this ontology generating operation.

After obtaining search result sentences through the search in S302, the searching unit 12 retrieves sentences (second search result sentences) each containing one of the first and second conceptually related words from the search result sentences (S303).

The analyzing and case structure generating unit 14 carries out a case analysis of a second search result sentence (S304). Based on the result of the case analysis, the analyzing and case structure generating unit 14 generates second case structure pattern information indicating the words in the second search result sentence and the case structure of the second search result sentence (S305). The analyzing and case structure generating unit 14 then calculates the similarity between the generated second case structure pattern information and the first case structure pattern information stored in the case structure pattern dictionary of the case structure pattern dictionary storing unit 16 (S306). If the similarity shows a value equal to or larger than a predetermined value, the ontology generating unit 18 generates an ontology having the first and second conceptually related words conceptually related to a predetermined word in the second case structure pattern information, and stores the ontology in the ontology storing unit 20 (S307).

Figure 9A:
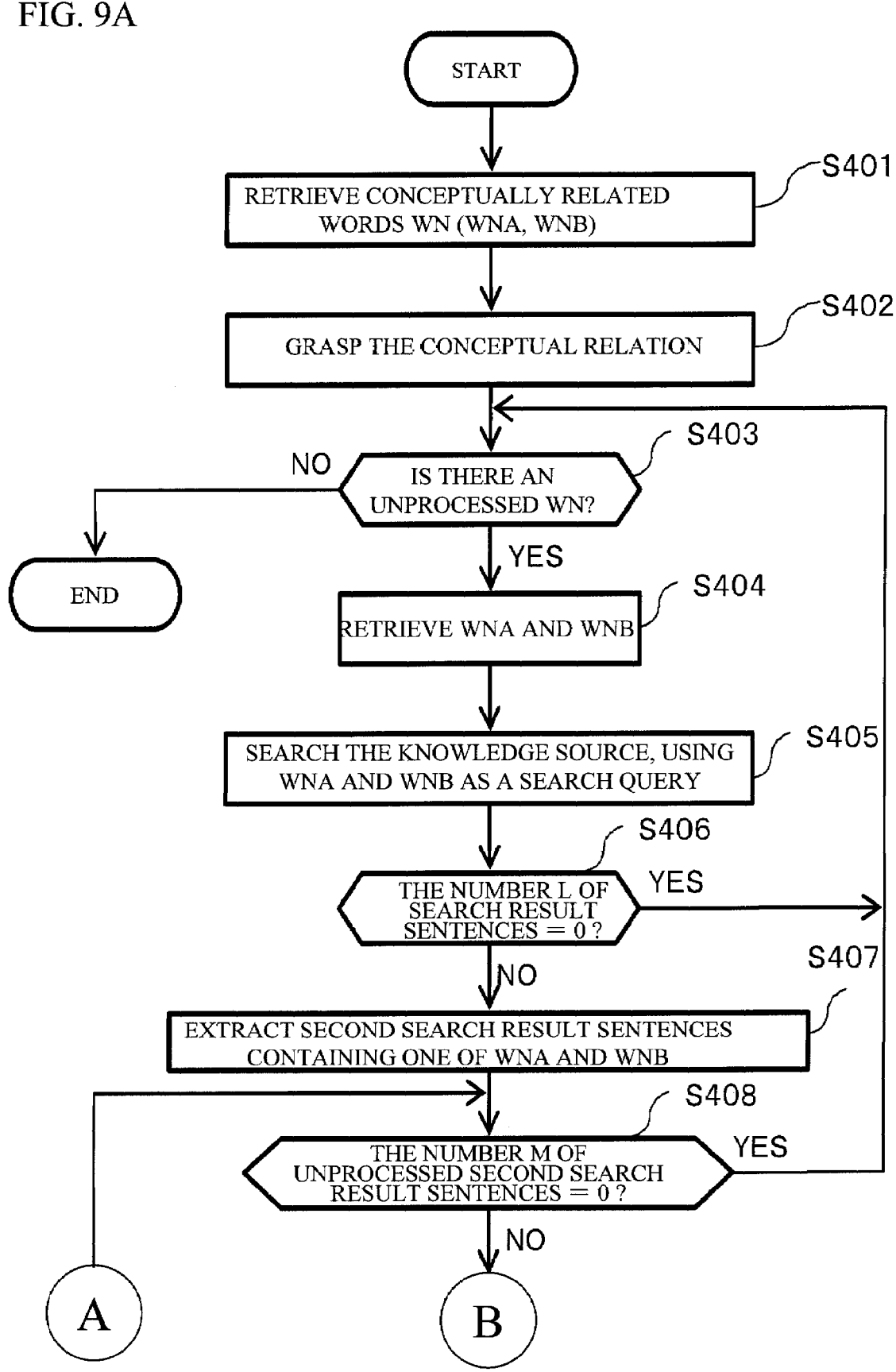
FIGS. 9A and 9B is a flowchart showing in greater detail the ontology generating operation.
Figure 9B:
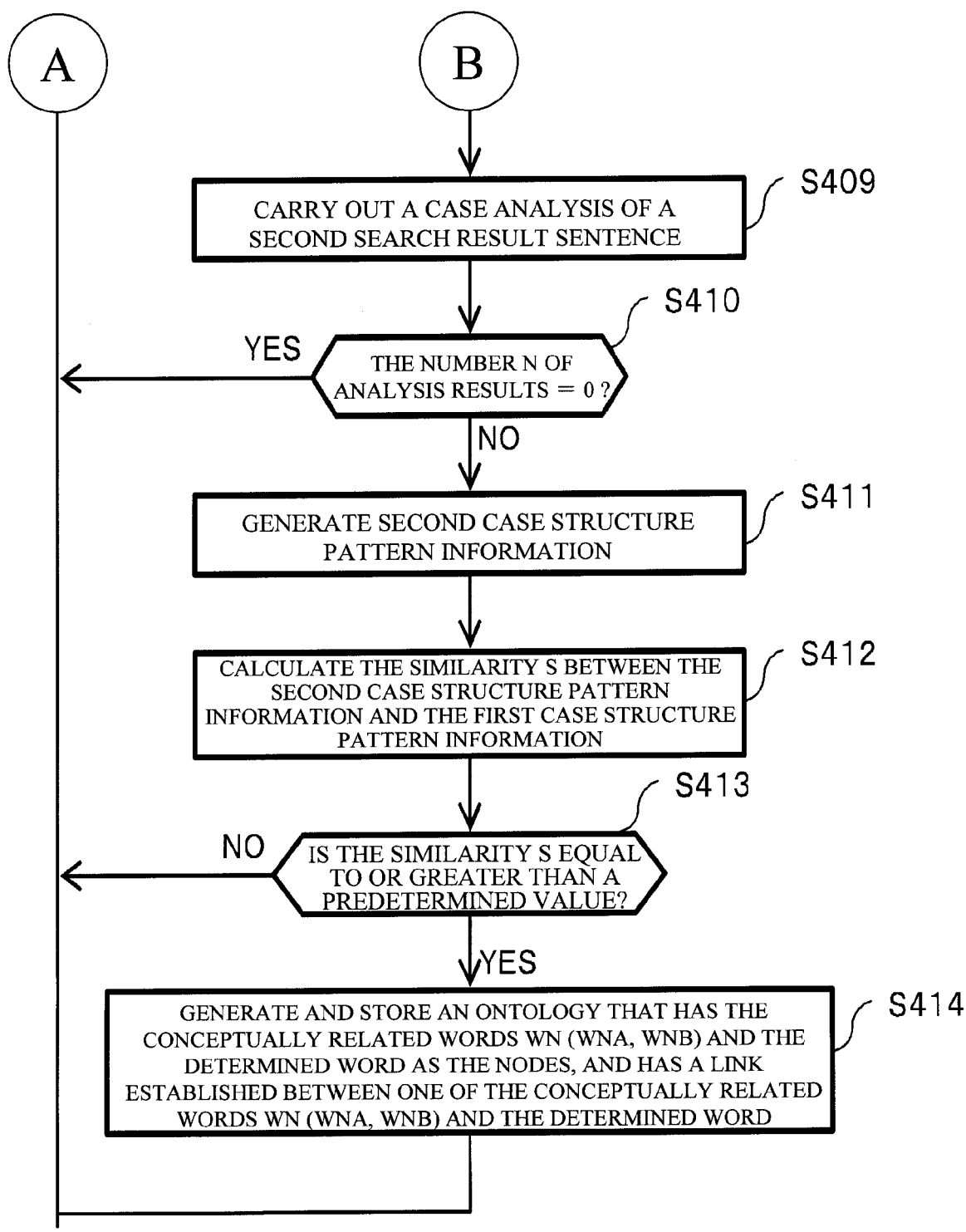

The above ontology generating operation is now described in greater detail. FIGS. 9A and 9B is a flowchart showing in greater detail the ontology generating operation to be performed by the PC 100. The procedures of S401 through S406 are the same as those of S201 through S206 shown in FIGS. 4A and 4B, and therefore, explanation of them is omitted herein.

If the number L of search result sentences is determined not to be zero in S406, the searching unit 12 extracts sentences (second search result sentences) each containing one of the conceptually related words Wna and Wnb from the search result sentences (S407). The searching unit 12 then determines whether the number M of unprocessed second search result sentences is zero, or whether there is a second search result sentence not to be processed in the procedure of S408 and the procedures thereafer (S408). If there is not a sentence containing one of the conceptually related words Wna and Wnb in the knowledge source 200, or if all the second search result sentences have been processed, the procedure for determining whether there is an unprocessed combination Wn (Wna, Wnb) of conceptually related words (S403) and the procedures thereafter are repeated.

If the number M of second search result sentences is not zero, the searching unit 12 outputs the second search result sentence(s) to the analyzing and case structure generating unit 14. The analyzing and case structure generating unit 14 selects one of the second search result sentences, and carries out a case analysis of the selected second search result sentence (S409).

The analyzing and case structure generating unit 14 next determines whether the number N of analysis results is zero (S410). If the number N of analysis results is zero, or if a "f-structure" cannot be obtained, the procedure for determining whether the number M of second search result sentences is zero (S408) and the procedures thereafter are repeated.

Figure 10:
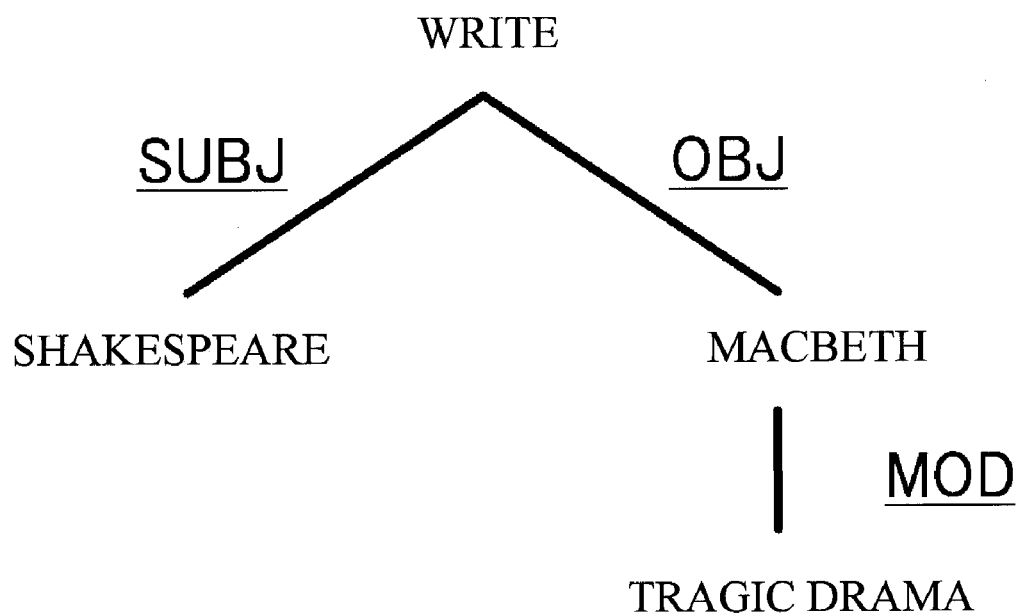
FIG. 10 shows an example of the tree structure with respect to a second search result sentence.

If the number N of analysis results is not zero, the analyzing and case structure generating unit 14 converts the "f-structure" into a tree structure representing the case structure in the form of a hierarchical structure. FIG. 10 shows the tree structure that is formed in a case where the conceptually related word Wna of the upper conception is "Shakespeare", the conceptually related word Wnb of the lower conception is "Hamlet", and the second search result sentence is "Shakespeare wrote the tragic play 'Macbeth'" containing only "Shakespeare".

Based on the obtained tree structure, the analyzing and case structure generating unit 14 generates second case structure pattern information indicating the words in the second search result sentence and the case structure in the second search result sentence (S411). More specifically, as in the above described process of generating the first case structure pattern information, the analyzing and case structure generating unit 14 adds the information about conceptually related words to the data structures of the second case structure pattern information, for each hierarchical level of the tree structure and each grammatical function.

Like the first case structure pattern information, the second case structure pattern information includes a first data structure and a second data structure. FIGS. 11A and 11B show an example of the second case structure pattern information corresponding to the tree structure shown in FIG. 10. For each of the words shown in the tree structure, the first row of the first data structure shows the hierarchical level and the grammatical function of the word. If the word is a conceptually related word, the second row of the first data structure shows the identifier of the conceptually related word. If the word is not a conceptually related word, the second row of the first data structure shows "new" representing the word and the predicator for the word. In the tree structure shown in FIG. 10, the conceptually related word Wna "Shakespeare" that has the grammatical function as a subject (SUBJ) and the word "Macbeth" that is not a conceptually related word and has the grammatical function as an object (OBJ) exist on the first hierarchical level, and "write" is the predicator for the conceptually related word Wna "Shakespeare" and the word "Macbeth" that is not a conceptually related word. Accordingly, in the first data structure shown in FIG. 11A, as for the conceptually related word Wna "Shakespeare", the first row shows the hierarchical level number "1" and "SUBJ" indicating the grammatical function as a subject, and the second row shows data including the predicator "write" and the identifier "Wna" of the conceptually related word. As for the word "Macbeth" that is not a conceptually related word, the first row shows the hierarchical level number "1" and "OBJ" indicating the grammatical function as an object, and the second row shows data including the predicator "write" and the identifier "new1" of the word "Macbeth" that is not a conceptually related word. In the tree structure shown in FIG. 10, other than the conceptually related words, the word "tragic play" having a grammatically function MOD exists on the second hierarchical level, and the predicator for the word "tragic play" is the word "Macbeth" that is not a conceptually related word. In the first data structure shown in FIG. 11A, as for the word "tragic play" that is not a conceptually related word, the first row shows the hierarchical level number "2" and "MOD" indicating the grammatical function, and the second row shows data including the identifier "new1" of the word "Macbeth" that is not a conceptually related word, and the identifier "new2" of the word "tragic play" that is not a conceptually related word.

In the second data structure, for each of the words shown in the tree structure, the first row shows the identifier of a conceptually related word, if the word is the conceptually related word. If the word is not a conceptually related word, the first row shows the identifier "new" of the word, the second row shows the hierarchical level and the grammatical function of the word, and the third row shows the surface character string of the word. In the tree structure shown in FIG. 10, the conceptually related word Wna "Shakespeare" that has the grammatical function as a subject (SUBJ) and the word "Macbeth" that has the grammatical function as an object (OBJ) and is not a conceptually related word exist on the first hierarchical level. Accordingly, in the second data structure shown in FIG. 11B, as for the conceptually related word Wna "Shakespeare", the first row shows the identifier "Wna" of the conceptually related word, the second row shows the hierarchical level number "1" and "SUBJ" indicating the grammatical function as a subject, and the third row shows data including the surface character string "Shakespeare". As for the word "Macbeth" that is not a conceptually related word, the first row shows the identifier "new1" of the word "Macbeth" that is not a conceptually related word, the second row shows the hierarchical level number "1" and "OBJ" indicating the grammatical function as an object, and the third row shows data including the surface character string "Macbeth". The tree structure shown in FIG. 10 also includes the words "tragic play" that has the grammatical function MOD and is not a conceptually related word. Accordingly, in the second data structure shown in FIG. 11B, as for the word "tragic play" that is not a conceptually related word, the first row shows the identifier "new2" of the word "tragic play" that is not a conceptually related word, the second row shows the hierarchical level number "2" and "MOD" indicating the grammatical function as a modifier, and the third row shows data including the surface character string "tragic play". As for the conceptually related word Wnb "Hamlet" that is not in the tree structure shown in FIG. 10, the first row shows the identifier "Wnb" of the conceptually related word, and the second and third rows show data as spaces.

The analyzing and case structure generating unit 14 next calculates the similarity S between the above second case structure pattern information and the first case structure information stored in the case structure pattern dictionary of the case structure pattern dictionary storing unit 16 (S412).

More specifically, the analyzing and case structure generating unit 14 compares the first row of the first data structure of the second case structure pattern information with the first row of the first data structure of the first case structure pattern information stored in the case structure pattern dictionary of the case structure pattern dictionary storing unit 16. If the first rows of the two first data structures are the same, or if the case structure of the second search result sentence corresponding to the second case structure pattern information is the same as the case structure of the first search result sentence corresponding to the first case structure pattern information, the analyzing and case structure generating unit 14 compares the second row of the first data structure of the second case structure pattern information with the second row of the first data structure of the first case structure pattern information. Based on the identifier of the word that is not a conceptually related word and is shown on the second row of the first data structure of the second case structure pattern information, the analyzing and case structure generating unit 14 detects a word that is not contained in the second case structure pattern information from the conceptually related words Wna and Wnb shown on the second row of the first data structure of the first case structure pattern information. If there is a word detected, the analyzing and case structure generating unit 14 sets the similarity S as the value ("1", for example) to be determined as "Yes" in S413. If there is not a word detected, the analyzing and case structure generating unit 14 sets the similarity S as the value ("0", for example) to be determined as "No" in S413.

For instance, the first row of the first data structure of the second case structure pattern information shown in FIG. 11A is the same as the first row of the first data structure of the first case structure pattern information shown in FIG. 7A. Also, of the identifiers "Wna" and "Wnb" of conceptually related words shown on the second row of the first data structure of the first case structure pattern information, the identifier of the conceptually related word that is not contained in the second case structure pattern information is "Wnb". Of the identifiers "new1" and "new2" of the unrelated words shown on the second row of the first data structure of the second case structure pattern information, the identifier corresponding to the identifier "Wnb" of the conceptually related word not contained in the second case structure pattern information is determined to be "new1". In this case, the analyzing and case structure generating unit 14 sets the similarity S between the second case structure pattern information shown in FIGS. 11A and 11B and the first case structure pattern information shown in FIGS. 7A and 7B as the value ("1", for example) to be determined as "Yes" in S413.

The analyzing and case structure generating unit 14 may be designed to set a higher similarity value S as the second case structure pattern information and the first case structure pattern information contain a larger number of identical or similar words between them. In such a case, the analyzing and case structure generating unit 14 not only determines the number of words contained in the second case structure pattern information and the first case structure pattern information, but also determines the number of words having the same or similar meanings. The words having similar meanings can be detected with the use of a thesaurus that is provided in the analyzing and case structure generating unit 14, for example. The analyzing and case structure generating unit 14 divides the number of words having the same or similar meanings by the total number of words contained in the second case structure pattern information and the first case structure pattern information, and sets a larger similarity value S as the value obtained as a result of the division is larger.

Alternatively, the similarity value S may be calculated in accordance with the following Equation (2). In Equation (2), "ExtStr" represents the second case structure pattern information, "Pattern" represents the first case structure pattern information, and "AllPatternNum" represents the total number of pieces of first case structure pattern information.

$$\text{Similarity } S = \frac{\sum_{i}^{N} \sum_{j}^{M} \frac{ExtStrData(i)}{PatternData(j)}}{AllPatternNum} \quad \text{(Equation 2)}$$

The ontology generating unit 18 then determines whether the similarity value S calculated in the above manner is equal to or greater than a predetermined value (0.5, for example) (S413). If the similarity value S is smaller than the predetermined value, the procedure for determining whether the number M of unprocessed first search result sentences is zero (S208) and the procedures thereafter are repeated.

If the similarity value S is equal to or greater than the predetermined value, the ontology generating unit 18 generates an ontology, with the nodes being the conceptually related words Wna and Wnb and the word (the determined word) represented by the identifier determined in S412 and contained in the second case structure pattern information. The ontology also has a link equivalent to the link representing the conceptual relation between the conceptually related word Wna and the conceptually related word Wnb that is not contained in the second case structure pattern information. The link is set between the conceptually related word Wna contained in the first case structure pattern information and the determined word. The ontology generating unit 18 stores the ontology in the ontology storing unit 20 (S414).

Figure 12A:
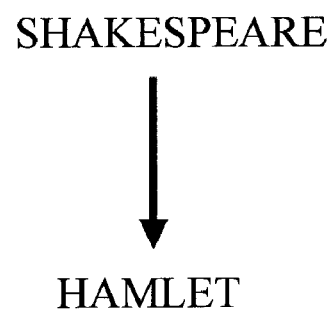
FIGS. 12A and 12B show an initial ontology and a new ontology.
Figure 12B:
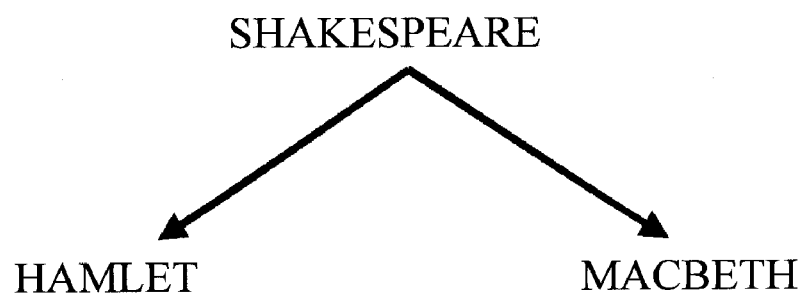

For instance, when the second case structure pattern information shown in FIGS. 11A and 11B is compared with the first case structure pattern information shown in FIGS. 7A and 7B, the identifier "new1" of the word that is contained in the second case structure pattern information and is not a conceptually related word is detected. The value S representing the similarity between the second case structure pattern information shown in FIGS. 11A and 11B and the first case structure pattern information shown in FIGS. 7A and 7B is equal to or greater than the predetermined value, and the determination result of S413 becomes "Yes". In this case, the ontology generating unit 18 refers to the second data structure of the second case structure pattern information, and retrieves the word "Macbeth" corresponding to the detected identifier "new1". The ontology generating unit 18 then sets a link between the conceptually related word Wna "Shakespeare" in the first case structure pattern information and the word "Macbeth". Here, the link is equal to the link representing the conceptual relation between the conceptually related word Wna "Shakespeare" and the conceptually related word Wnb "Hamlet". In this manner, the ontology generating unit 18 generates an ontology showing a new conceptual relation. In the beginning, there is only the link representing the conceptual relation between the conceptual related word Wna "Shakespeare" and the conceptually related word Wnb "Hamlet", as shown in FIG. 12A. After the above described procedures, a new link representing a conceptual relation is established between the conceptually related word Wna "Shakespeare" and the word "Macbeth", as shown in FIG. 12B.

The procedure for determining whether the number M of unprocessed second search result sentences is zero (S408) and the procedures thereafter are then repeated. If the number M of unprocessed second search result sentences is zero, the procedure for determining whether there is an unprocessed combination Wn (Wna, Wnb) of conceptually related words (S403) is again carried out. Where all the combinations Wn (Wna, Wnb) of conceptually related words have been processed, the series of procedures come to an end.

As described above, the PC 100 forming the conceptual network generating system of this embodiment obtains the first and second conceptually related words that are conceptually related to each other. Based on the case structure of a first search sentence containing both first and second conceptually related words and the case structure of a second search result sentence containing one of the first and second conceptually related words, the PC 100 can obtain the conceptual relation between one of the first and second conceptually related words and some other word. The PC 100 adds the new conceptual relation to the conceptual network, and accordingly, the conceptual network can be automatically expanded.

Also, as the above described procedures are not manually carried out, the generated conceptual network can be prevented from becoming arbitrary.

It is also possible to add field information indicating fields (such as the "field of medicine") to the first and second conceptually related words and the search sentences stored in the knowledge source 200. In such a case, the searching unit 12 searches the knowledge source 200 to retrieve first search result sentences accompanied by the same field information as the field information attached to the first and second conceptually related words, and to retrieve second search result sentences accompanied by the same field information as the field information attached to one of the first and second conceptually related words. In this manner, a proper searching operation can be performed, with the fields being taken into consideration. For example, users can retrieve only the search sentences belonging to the field that is input together with conceptually related words. Thus, a conceptual network with high precision can be generated.

Figure 13:
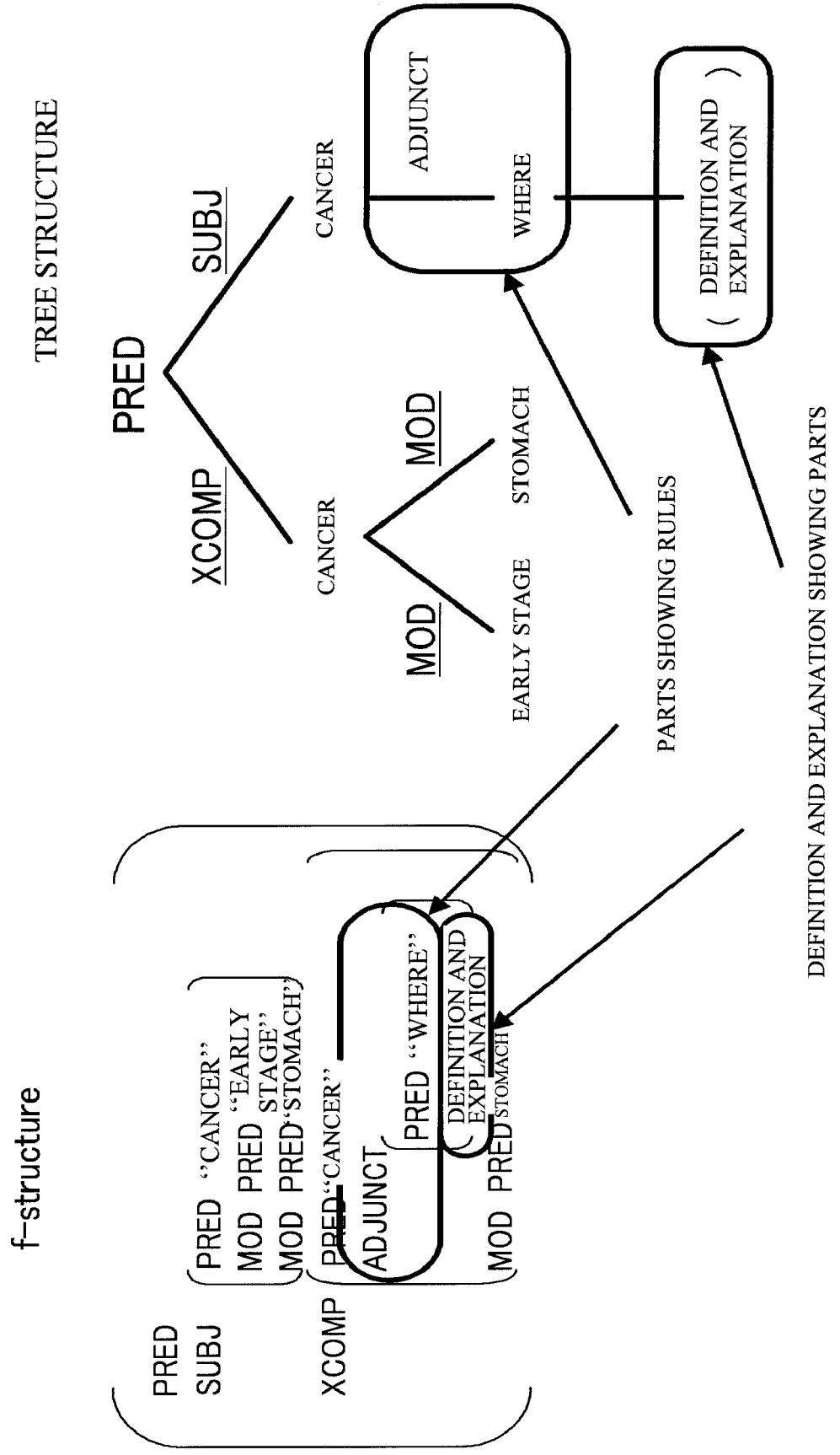
FIG. 13 shows an example of the "f-structure" and the tree structure containing definitions and explanations.
Figure 14:
FIG. 14 shows an example of an ontology containing definitions and explanations.

The analyzing and case structure generating unit 14 may also be designed to detect a description of a definition and explanation in compliance with rules for definitions and explanations in a case analyzing operation for the first and second search result sentences, with the rules having being set in advance. FIG. 13 shows the "f-structure" and the tree structure that is formed for a search result sentence "The early-stage stomach cancer is a state of stomach cancer where the outward progression of cancer stops in the submucosa". In a case where the case structure has a predicator PRED as the lower conception, the grammatical function is "ADJUNCT", and the surface character string is "where", the analyzing and case structure generating unit 14 determines that the case structure of the adjunct "where" is the description of a definition and explanation in accordance with the rules, as shown in FIG. 13. Accordingly, an ontology containing the description of a definition and explanation can be obtained, as shown in FIG. 14. Thus, descriptions of definitions and explanations can be used to further expand a conceptual network.

Figure 15:
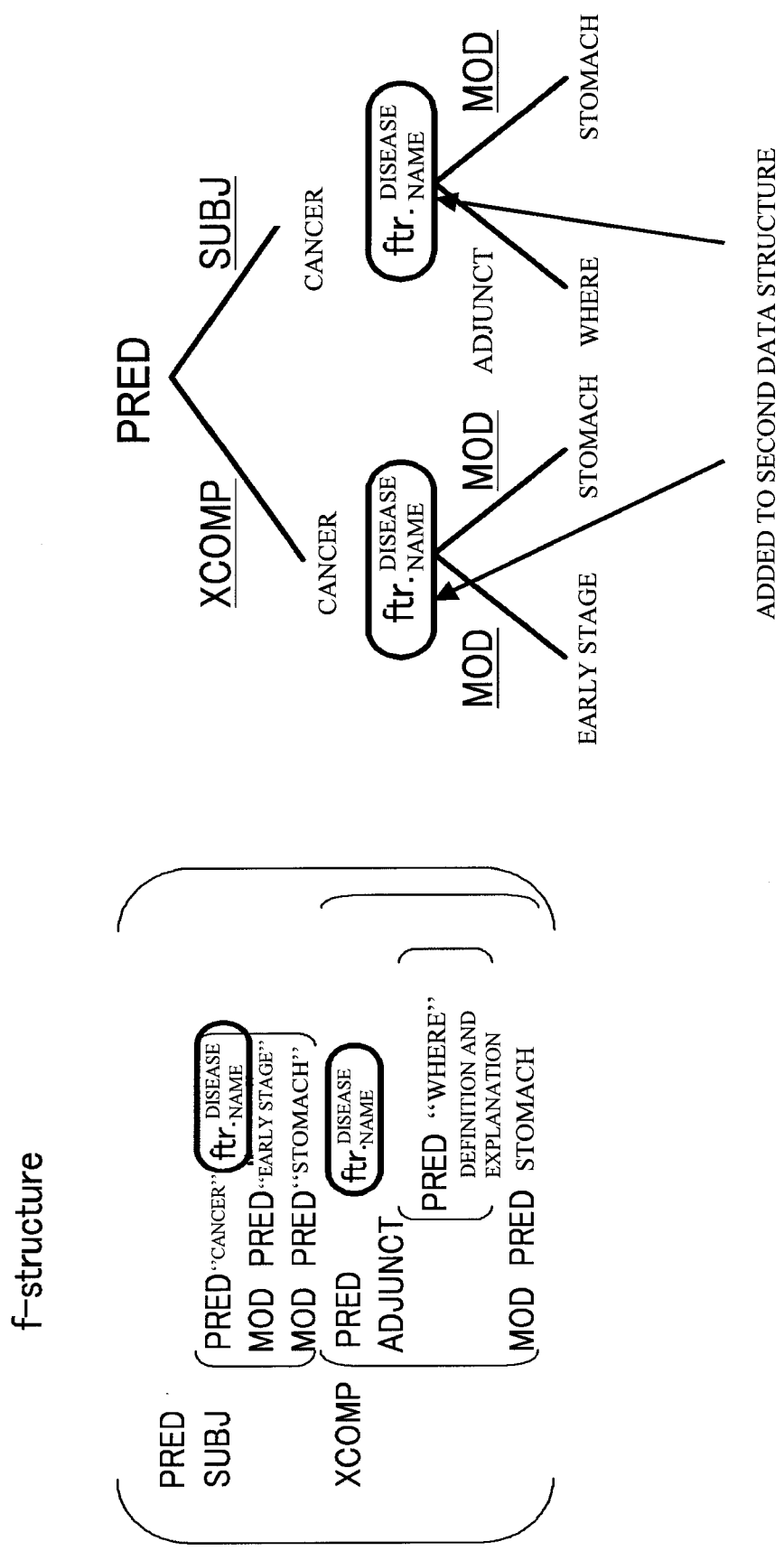
FIG. 15 shows an example of the "f-structure" and the tree structure containing the attribute information about words.
Figure 16:
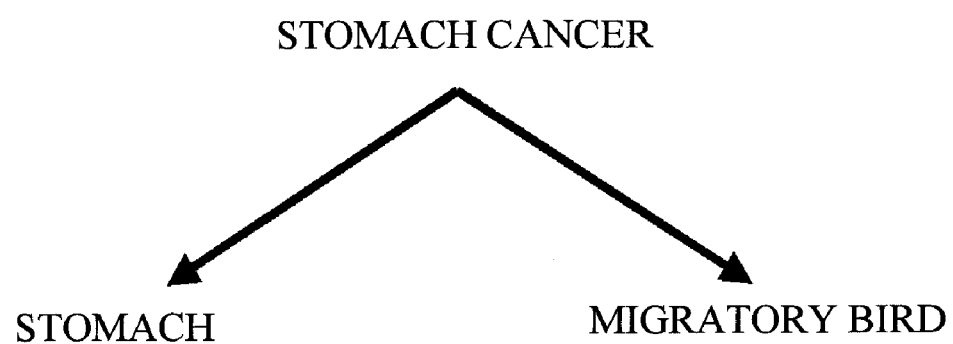
FIG. 16 shows an example of an ontology showing wrong conceptual relations.

It is also possible to add attribute information indicating the attributes of words to the first and second conceptually related words and the words in the search sentences stored in the knowledge source 200. The searching unit 12 then searches the knowledge source 200 to retrieve first search result sentences containing words accompanied by the same attribute information as the attribute information attached to the first and second conceptually related words, and to retrieve second search result sentences containing words accompanied by the same attribute information as the attribute information attached to one of the first and second conceptually related words. In this case, the analyzing and case structure generating unit 14 obtains a "f-structure" and a tree structure containing the attribute information. For example, the "f-structure" and the tree structure shown in FIG. 15 contain attribute information "feature (ftr.)" indicating that the word "cancer" is a disease name. Accordingly, a conceptual network can be generated, with the attribute of each word being taken into consideration. Even if there is case structure pattern information containing the word "goose" (pronounced the same as "cancer" in Japanese) that is a kind of bird, the word "goose" and the word "cancer" are distinguished from each other by virtue of the attribute information. Accordingly, an ontology that indicates a wrong conceptual relation as shown in FIG. 16 cannot be generated.

The analyzing and case structure generating unit 14 may also contain a thesaurus, and use the thesaurus to generate new first case structure pattern information having a word in the first case structure pattern information with a similar word, and to generate new second case structure pattern information having a word in the second case structure pattern information with a similar word.

Figure 17A:
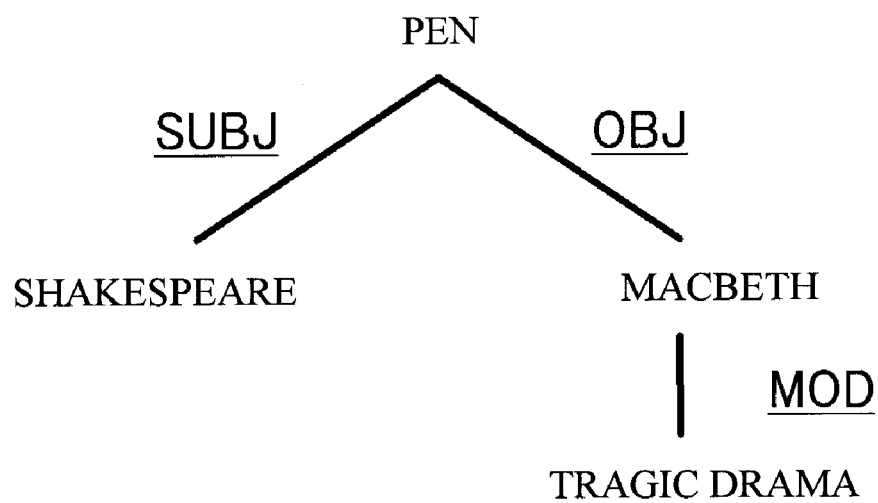
FIGS. 17A and 17B show a first example of a tree structure containing words similar to each other.
Figure 17B:
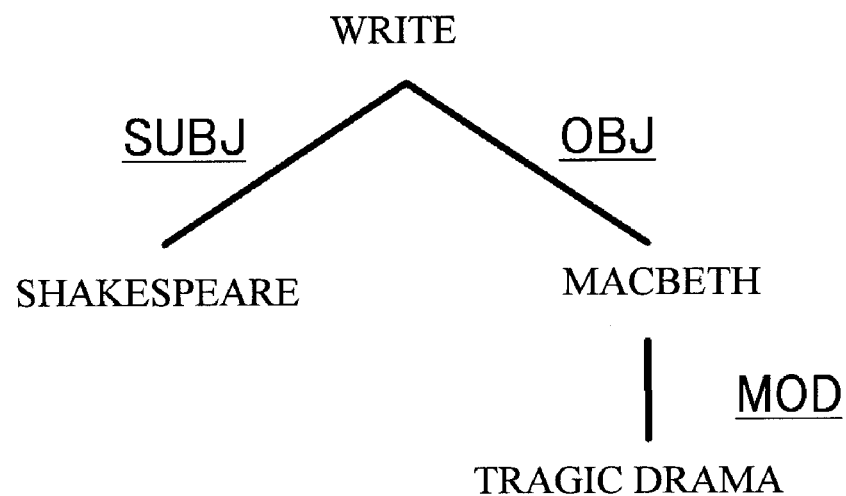
Figures 18A, 18B:
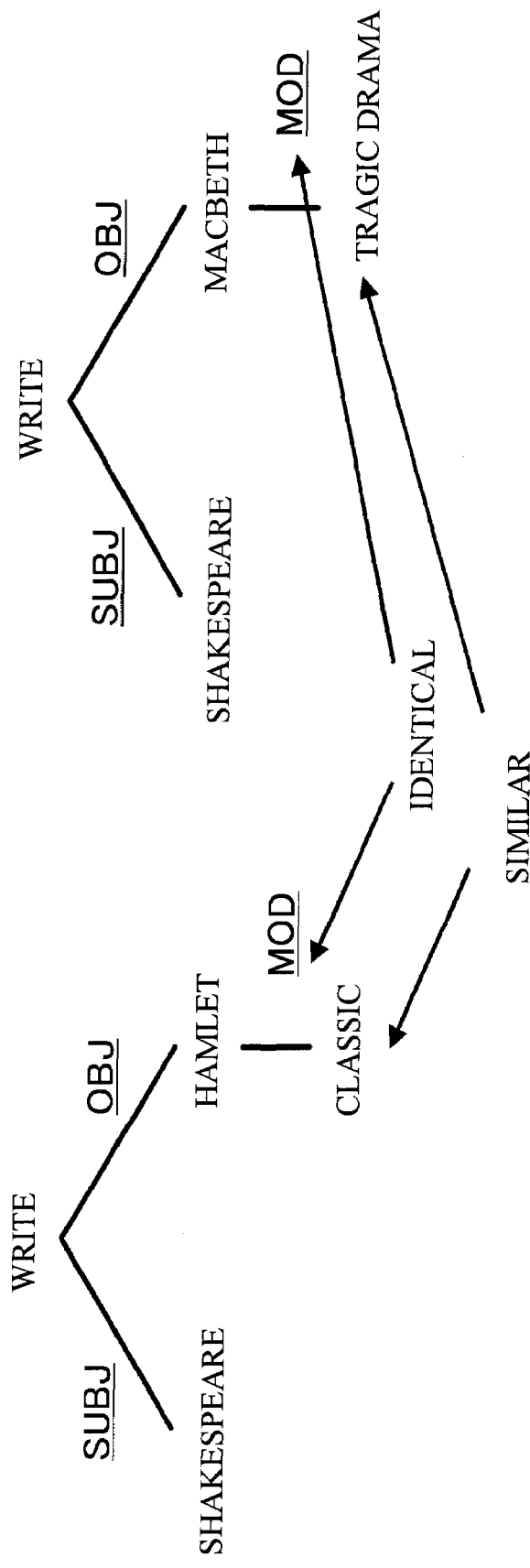
FIGS. 18A and 18B show a second example of a tree structure containing words similar to each other.

For example, in a case where the tree structure corresponding to the sentence "Shakespeare penned the tragic play 'Macbeth'" shown in FIG. 17A is obtained, the analyzing and case structure generating unit 14 uses the thesaurus to replace the predicator "pen" with "write". As a result, the tree structure corresponding to the sentence "Shakespeare wrote the tragic play 'Macbeth'" shown in FIG. 17B is obtained. In a case where the tree structure corresponding to the sentence "Shakespeare wrote the classic 'Hamlet'" shown in FIG. 18A is obtained, the analyzing and case structure generating unit 14 replaces the word "Hamlet" conceptually related to the word "Shakespeare" with the word "Macbeth" conceptually related to the word "Shakespeare". The analyzing and case structure generating unit 14 further replaces the word "classic" with the word "tragic play", so as to obtain the tree structure corresponding to the sentence "Shakespeare wrote the tragic play 'Macbeth'" shown in FIG. 18B.

The analyzing and case structure generating unit 14 may also be designed to carry out a dependency parsing process on the first and second search result sentences, instead of a case analysis. FIG. 19 shows a result of the dependency parsing process carried out on the sentence "The early-stage stomach cancer is a state of stomach cancer where the outward progression of cancer stops in the submucosa". The dependency parsing process is a method for analyzing the modification relation between words in a sentence.

A method for generating a conceptual network showing conceptual relations between words, employed according to an aspect of the present invention is performed with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-251915 filed Sep. 15, 2006.

What is claimed is:

1. A computer-implemented conceptual network generating system that generates a conceptual network showing conceptual relations between words, the conceptual network generating system comprising:
   a first searching unit that searches a knowledge source storing search sentences, using as a search query first and second words conceptually related to each other, and retrieves a first search result sentence containing the first and second words;
   a first generating unit that analyzes the retrieved first search result sentence, and generates first structure information indicating words contained in the first search result sentence and a structure of the first search result sentence;
   a holding unit that stores the generated first structure information in a memory unit;
   a second searching unit that searches the knowledge source, using the first word as a search query, and retrieves a second search result sentence containing the first word;
   a second generating unit that analyzes the retrieved second search result sentence, and generates second structure information indicating words contained in the second search result sentence and a structure of the second search result sentence;
   a calculating unit that calculates similarity between the generated second structure information and the stored first structure information; and
   a setting unit that generates conceptual network information, based on the generated first structure information and second structure information having a similarity value equal to or larger than a first predetermined value with respect to the first structure information, the conceptual network information showing a conceptual relation between the first word and a third word contained in the second search result sentence corresponding to the second structure information, the conceptual relation between third word and the first word being equivalent to a conceptual relation between the second word and the first word.

2. The computer-implemented conceptual network generating system according to claim 1, wherein, when a value obtained by putting the number of pieces of first structure information showing identical structures into a predetermined conditional expression is equal to or greater than a second predetermined value, the holding unit stores and holds the first structure information showing the identical structures in the memory unit.

3. The computer-implemented conceptual network generating system according to claim 1, wherein the calculating unit has the similarity value equal to or greater than the first predetermined value, when the generated second structure information and the stored first structure information show identical structures.

4. The computer-implemented conceptual network generating system according to claim 1, wherein the calculating unit makes the similarity value larger, when the generated second structure information and the stored first structure information contain a larger number of identical or similar words.

5. The computer-implemented conceptual network generating system according to claim 1, wherein:
   field information that indicates fields is attached to the first and second words and the search sentences;
   the first searching unit retrieves a first search result sentence accompanied by the same field information as the field information attached to the first and second words; and
   the second searching unit retrieves a second search result sentence accompanied by the same field information as the field information attached to the first word.

6. The computer-implemented conceptual network generating system according to claim 1, wherein:

the first generating unit generates first structure information that indicates a description of a definition and explanation in the first search result sentence;

the second generating unit generates second structure information that indicates a description of a definition and explanation in the second search result sentence; and the setting unit generates conceptual network information that contains the descriptions of the definitions and explanations.

7. The computer-implemented conceptual network generating system according to claim 1, wherein:

attribute information that indicates attributes of words is attached to the first and second words and words contained in the search sentences;

the first searching unit retrieves a first search result sentence that contains a word accompanied by the same attribute information as the attribute information attached to the first and second words; and the second searching unit retrieves a second search result sentence that contains a word accompanied by the same attribute information as the attribute information attached to the first word.

8. The computer-implemented conceptual network generating system according to claim 1, wherein:

the first generating unit renews the first structure information by replacing a word contained in the first structure information with a similar word; and the second generating unit renews the second structure information by replacing a word contained in the second structure information with a similar word.

9. The computer-implemented conceptual network generating system according to claim 1, wherein:

the first generating unit carries out a case analysis or a dependency parsing process on the retrieved first search result sentence; and the second generating unit carries out a case analysis or a dependency parsing process on the retrieved second search result sentence.

10. The computer-implemented conceptual network generating system according to claim 1, wherein the second word and the third word are different from each other.

11. The computer-implemented conceptual network generating system according to claim 1, wherein the second search result sentence does not contain the second word.

12. The computer-implemented conceptual network generating system according to claim 1, further comprising at least one of a memory and a processor.

13. A method of generating a conceptual network showing conceptual relations between words, the method comprising:

searching a knowledge source storing search sentences, using as a search query first and second words conceptually related to each other, and retrieving a first search result sentence containing the first and second words;

analyzing the retrieved first search result sentence, and generating first structure information indicating words contained in the first search result sentence and a structure of the first search result sentence;

storing the generated first structure information in a memory unit;

searching the knowledge source using the first word as a search query, and retrieving a second search result sentence containing the first word;

analyzing the retrieved second search result sentence, and generating second structure information indicating words contained in the second search result sentence and a structure of the second search result sentence;

calculating similarity between the generated second structure information and the stored first structure information; and generating conceptual network information, based on the generated first structure information and second structure information having a similarity value equal to or larger than a first predetermined value with respect to the first structure information, the conceptual network information showing a conceptual relation between the first word and a third word contained in the second search result sentence corresponding to the second structure information, the conceptual relation between the third word and the first word being equivalent to a conceptual relation between the second word and the first word.

14. A computer readable medium storing a program causing a computer to execute a process for generating a conceptual network showing conceptual relations between words, the process comprising:

search a knowledge source storing search sentences, using as a search query first and second words conceptually related to each other, and retrieve a first search result sentence containing the first and second words;

analyze the retrieved first search result sentence, and generate first structure information indicating words contained in the first search result sentence and a structure of the first search result sentence;

store the generated first structure information in a memory unit;

search the knowledge source using the first word as a search query, and retrieve a second search result sentence containing the first word;

analyze the retrieved second search result sentence, and generate second structure information indicating words contained in the second search result sentence and a structure of the second search result sentence;

calculate similarity between the generated second structure information and the stored first structure information; and generate conceptual network information, based on the generated first structure information and second structure information having a similarity value equal to or larger than a first predetermined value with respect to the first structure information, the conceptual network information showing a conceptual relation between the first word and a third word contained in the second search result sentence corresponding to the second structure information, the conceptual relation between the third word and the first word being equivalent to a conceptual relation between the second word and the first word.

* * * * *